(12) United States Patent
Nakamura (10) Patent No.: US 6,188,426 B1
(45) Date of Patent: Feb. 13, 2001

(54) PRINTER WITH MICROMIRROR DEVICE AND EXPOSURE METHOD THEREFOR

(75) Inventor: Hiroaki Nakamura, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 08/865,183

(22) Filed: May 29, 1997

(30) Foreign Application Priority Data

May 30, 1996 (JP) .................................................... 8-137265

(51) Int. Cl.[7] ...................................................... B41J 2/47

(52) U.S. Cl. ........................ 347/239; 347/255; 348/770; 348/771

(58) Field of Search ..................................... 347/239, 241, 347/255; 345/205, 31; 348/770, 771, 764, 755

(56) References Cited

U.S. PATENT DOCUMENTS

| | | | |
|---|---|---|---|
| 5,461,410 | 10/1995 | Venkateswar et al. | 347/240 |
| 5,510,824 | * 4/1996 | Nelson | 347/239 |
| 5,657,036 | * 8/1997 | Markandey et al. | 345/85 |
| 5,668,611 | * 9/1997 | Ernstoff et al. | 348/771 |

FOREIGN PATENT DOCUMENTS 7-131648   5/1995   (JP) ............................... H04N/1/405

OTHER PUBLICATIONS

N. Nishida "Micro Machines And Optical Techniques (2) Digital Micromirror Devices (DMD) And Their Applications To Displays", Oct. 1994 Issue of *O plus E*, No. 179, pp. 90–94.

G. Um, D. Foley, A. Silagyi, J.B. Ji, Y.B. Jeon and Y.K. Kim "Recent Advance in Actuated Mirror Array (AMA) Projector Development", *Asia Display*, 1995, pp. 95–98.

J.M. Youse "Mirrors On A Chip", Nov. 1993 Issue of *IEEE Spectrum*, pp. 27–31.

W.E. Nelson and R.L. Bhuva "Digital Micromirror Device Imaging Bar For Hardcopy", SPIE, vol. 2413, pp. 58–65, Feb. 1995.

G.A. Feather "Micromirrors And Digital Processing", May 1995 issue of *Photonics Spectra*, pp. 118–124.

* cited by examiner

*Primary Examiner*—N. Le
*Assistant Examiner*—Hai C. Pham
(74) *Attorney, Agent, or Firm*—Sughrue, Mion, Zinn, Macpeak & Seas, PLLC (57) ABSTRACT

An exposure method for a printer with a micromirror device as a spatial light modulator. In an exposure sequence of one color, each micromirror of the mirror array of the spatial light modulator is driven by N-bit mirror drive data sequentially from most to least significant bits. While the micromirrors are driven responsive to the most to Jth significant bits of the N-bit data, the micromirrors are illuminated continuously, and the driving time intervals are reduced half by half. While the micromirrors are driven responsive to the lower bits of the N-bit data, the driving time intervals are maintained at a constant shortest value, and the micromirrors are illuminated intermittently for shorter times than the shortest driving time interval, allowing for more tonal levels than possible by modulating mirror driving intervals alone.

20 Claims, 9 Drawing Sheets

| LINE | 1ST RED EXPOSURE | | 1ST GREEN EXPOSURE | | 1ST BLUE EXPOSURE | | 2ND RED EXPOSURE | | 2ND GREEN EXPOSURE | | 2ND BLUE EXPOSURE | | 3RD RED EXPOSURE | |
|---|---|---|---|---|---|---|---|---|---|---|---|---|---|---|
| | MIRROR | EXPOSURE CONDITION | MIRROR | EXPOSURE CONDITION | MIRROR | EXPOSURE CONDITION | MIRROR | EXPOSURE CONDITION | MIRROR | EXPOSURE CONDITION | MIRROR | EXPOSURE CONDITION | MIRROR | EXPOSURE CONDITION |
| 1 | A1 | R | A2 | RG | A3 | RGB | B1 | r RGB | B2 | rg RGB | B3 | rgbRGB | | rgbRGB |
| 2 | | | A1 | G | A2 | GB | A3 | RGB | B1 | g RGB | B2 | gbRGB | B3 | rgbRGB |
| 3 | | | | | A1 | B | A2 | R B | A3 | RGB | B1 | bRGB | B2 | r bRGB |
| 4 | | | | | | | A1 | R | A2 | RG | A3 | RGB | B1 | r RGB |
| 5 | | | | | | | | | A1 | G | A2 | GB | A3 | RGB |
| 6 | | | | | | | | | | | A1 | B | A2 | R B |
| 7 | | | | | | | | | | | | | A1 | R |

PRINTER WITH MICROMIRROR DEVICE AND EXPOSURE METHOD THEREFOR

BACKGROUND OF THE INVENTION

1. Field of the Invention

The present invention relates to a printer with a micromirror device as a spatial light modulator and an exposure method therefor, by which a hard copy of an image is reproduced with high-fidelity without lowering print speed.

2. Background Arts

A spatial light modulator (SLM) has been used for deflecting a light beam, for example, in a laser optical system. Recently, a mirror type spatial light modulator has been developed which has an array of very small mirror elements called micromirrors, whose tilt angle is each individually changeable to control the deflection. As the mirror type SLM, there are a digital micromirror devices (DMD) which use electrostatic forces to move the micromirror, and piezoelectric type micromirror devices (AMA) which move the micromirror by the use of mechanical deformation of fine piezoelectric elements. Because the micromirror devices have an imaging function, their applications to image projectors and printers has been studied. The principle and applications of the DMD are described, for example, in a monthly magazine O plus E, October 1994, pages 90–94.

For example, a DMD has an array of large number of micromirrors, and a static RAM (SRAM) which are integrally formed on a silicone substrate by a semiconductor technique. One micromirror of the array is mounted above each memory cell of the SRAM, so as to sway about a diagonal axis. While the power is off, the micromirrors are oriented horizontal or parallel to the plane of the substrate, hereinafter called a balanced state. When 1-bit mirror drive data is written in each memory cell, the corresponding micromirror tilts by an angle +θ or −θ from the balanced state, depending upon the binary value of the mirror drive data. For example, the position tilt by the angle +θ is an ON-state where the micromirror reflects illumination light projected diagonally from a light source, e.g. an angle 2θ from the perpendicular to the substrate plane, toward an imaging lens. A light spot or an image of the micromirror is formed through the imaging lens onto a photographic material or a screen, constituting a pixel. The position tilt by the angle −θ is an OFF-state where the illumination light reflected from the micromirror is directed to a light absorbing plate, and is not utilized for imaging.

Since the DMD operates in a digital fashion, the printer or hardcopy system with the DMD controls the total exposure time per pixel by changing the total time duration of the ON-state of the micromirror per pixel, to print a gradation image. That is, the tonal level of one pixel is controlled by changing the time duration of a continuous ON-state and/or the number of intermittent ON-states of the micromirror per pixel. The time durations of the ON- or OFF-state of the micromirror can be controlled according to a conventional pulse width modulation method. For example, it is possible to reduce the driving time intervals of the micromirrors half by half within an exposure sequence for one line. However, the minimum time duration and the minimum interval of ON-OFF switching are limited by the time necessary for the micromirror to switch over between the ON-state and the OFF-state. The shortest possible mirror response time is about 15 $\mu$seconds in the state of art.

For example, in order to achieve 256 tonal levels per pixel at a print density of 600 dpi (dot/inch) and at a print speed of 1.75 inch/sec by use of a 8-bit pulse width modulation, the DMD micromirror is required to switch over in a very short time of about 1 $\mu$seconds. Since the mirror response time is about 15 $\mu$seconds, the printer with the DMD cannot achieve such a fine gradation as above. JPA 7-131648 discloses a gradation printing method which is made to solve the above problem in the gradation printing with a spatial light modulator.

According to the Japanese prior art, a micromirror array consists of a lot of rows of micromirrors to perform multiple-exposure or row integration, so the response speed of the DMD may be relatively low, that is, the response time of the DMD can be relatively long. For example, using a micromirror array consisting of 64 rows, the necessary response time of the DMD is about 60 $\mu$seconds for the above 256 tonal level printing. Therefore, the 256 tonal levels is possible according to this method.

However, since the above prior method requires a large number of micromirrors, and needs more micromirrors to achieve more tonal levels or higher print speed, the cost is inevitably high. Moreover, for color printing, the response speed of the micromirrors are required to be three times as high as that required for monochrome printing in order to achieve the same tonal levels at the same print speed. Therefore even with the micromirror array having 64 rows, the response time should be less than 20 $\mu$seconds to achieve the 256 tonal levels.

SUMMARY OF THE INVENTION

In view of the foregoing, a prime object of the present invention is to provide a printer using a micromirror device as a spatial light modulator and an exposure method for the printer, whereby a greater tonal levels is achieved with a micromirror array having a relatively small number of rows at a sufficiently high print speed.

The present invention includes a printer with a micromirror device as a spatial light modulator which is comprised of an array of micromirrors, each micromirror being switchable between an ON-state and an OFF-state depending upon which binary value is assigned thereto; a light source for illuminating the micromirrors; an optical system for forming pixels on a photographic material from light beams reflected from those micromirrors which are in the ON-state; means for producing N-bit mirror drive data from image data of one pixel, N being a plural integer; means for driving the micromirrors by the N-bit mirror drive data sequentially from most to least significant bits at predefined various time intervals; and means for modulating light quantity from the light source within a driving time interval of the micromirrors.

An exposure method of the present invention for the printer having the above configurations comprising the steps of producing N-bit mirror drive data from image data of one pixel, N being a plural integer; driving the micromirrors by the N-bit mirror drive data sequentially from most to least significant bits at predefined various time intervals; and modulating light quantity from the light source within a driving time interval of the micromirrors.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
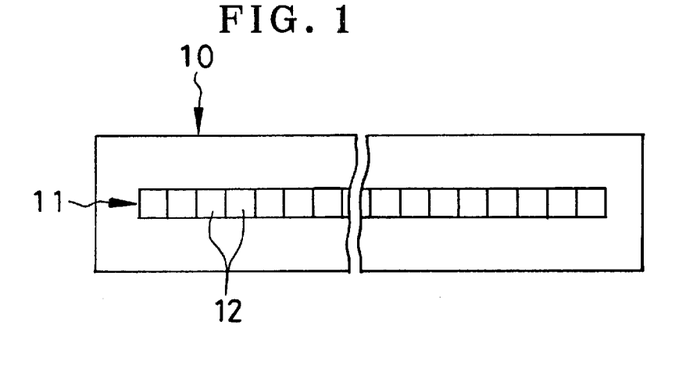
FIG. 1 is a schematic top plan view of a digital micromirror device with a row of micromirrors.
Figure 2:
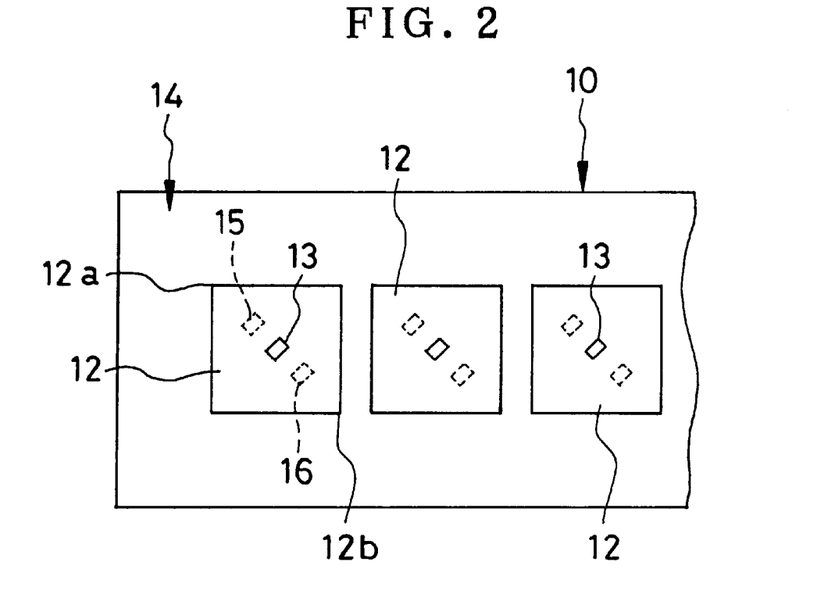
FIG. 2 is an enlarged fragmentary top plan view of the digital micromirror device.

FIG. 1 shows an example of digital micromirror device (DMD) 10, which has a mirror array 11 consisting of a row of micromirrors 12. As shown in FIG. 2, the micromirror 12 is a square chip, e.g. 16 μm on a side, and is supported at its center on a post 13 above a static RAM (SRAM) 14. The mirror array 11 and the SRAM 14 are fabricated on a silicone substrate by a conventional transistor integration technique. The micromirror 12 is made of conductive metal foil, e.g. aluminum foil.

Address electrodes 15 and 16 are formed on opposite diagonal sides of the post 13. By virtue of static electricity charged between the micromirror 12 and the address electrodes 15 and 16, the micromirror 12 is tilted such that one of two tips 12a and 12b that are in alignment with the address electrodes 15 and 16 and the central post 13 comes into contact with the substrate plane. Practically, the micromirror 12 is suspended over an air gap by torsion hinges at other two tips thereof.

Figure 3A:
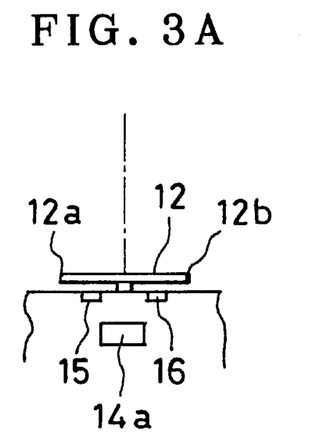
FIGS. 3A, 3B and 3C are side views of one segment of the digital micromirror device, illustrating the operation of the micromirror.
Figure 3B:
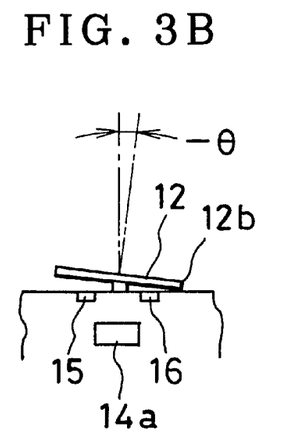
Figure 3C:
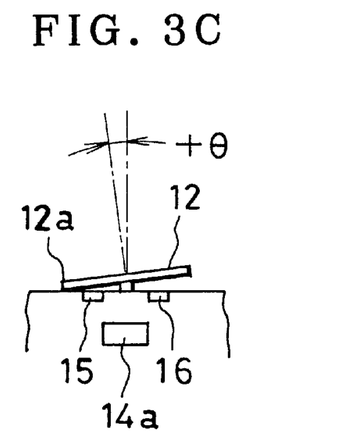

As shown in FIGS. 3A to 3C, each micromirror 12 is disposed above an individual memory cell 14a of the SRAM 14. Each memory cell 14a constitutes a flip-flop with at least two transistors, which are alternatively turned ON depending upon 1-bit mirror drive data applied to the memory cell 14a. The mirror drive data is stored until the next mirror drive data is applied to the memory cell 14a. The transistors are connected to the address electrodes 15 and 16. In correspondence with the switching conditions of the connected transistors, one of the address electrodes 15 and 16 is charged with a positive voltage to serve as a plus electrode, and the other with a negative voltage to serve as a minus electrode. When a bias voltage is applied to the micromirror 12, a static power is generated between the micromirror 12 and the address electrodes 15 and 16, to tilt the micromirror 12 toward one electrode.

When the power is OFF, all transistors are OFF, so any address electrodes 15 and 16 are not charged with voltage, and any bias voltage is applied to the micromirror 12. Therefore, the 12 is kept in the balanced state, as shown in FIG. 3A. Also, even when the mirror drive data is written in the memory cell 14a, if the bias voltage is not applied, the micromirror 12 is kept in the balanced state.

In this embodiment, when the mirror drive data written in the memory cell 14a is "0", the address electrode 15 functions as the plus electrode, and the address electrode 16 functions as the minus electrode. When a positive voltage is applied as the bias voltage to the micromirror 12, inclines to the side of the address electrode 16 till the tip 12b contacts the silicone substrate, as shown in FIG. 3B, due to the static adsorption and repulsion. The tilt angle in this state is $-\theta$. When the mirror drive data written in the memory cell 14a is "1", the address electrode 15 functions as the minus electrode, and the address electrode 16 functions as the plus electrode. When the positive bias voltage is applied to the micromirror 12, inclines to the side of the address electrode 15 till the tip 12a contacts the silicone substrate, as shown in FIG. 3C, due to the static adsorption and repulsion. The tilt angle in this state is $+\theta$. In this way, the micromirror 12 tilts by $-\theta$ or $+\theta$ in accordance with the mirror drive data.

While the power is supplied, the micromirror 12 takes either one of the two tilt states. In one tilt state, e.g. where the micromirror 12 tilts by $+\theta$, a spot light beam reflected from the is directed to an imaging light path for forming a pixel. Therefore, this tilt state is called an ON-state or valid reflection state. In the other tilt state, i.e. where the micromirror 12 tilts by $-\theta$ in this instance, a spot light beam reflected from the micromirror 12 is directed to a light elimination path, and does not form a pixel. Therefore, the latter tilt state is called an OFF-state or invalid reflection state. It takes, for example, about 15 μseconds for the micromirror 12 to move from the ON-state to the OFF-state, and vise versa. That is, the response time of the micromirror 12 is about 15 μseconds. It is to be noted that the illumination light incident on the horizontal micromirror plane in the balanced state is also deflected from the imaging light path.

To print a gradation image with the DMD 10, the tonal level of one pixel is determined by the total exposure time per pixel that corresponds to the total time duration of the ON-state of the micromirror 12 per pixel. Therefore, it is possible to change the tonal level of each pixel by changing the time duration of a continuous ON-state and/or the number of intermittent ON-states of the micromirror 12 per pixel. However, as set forth above, the minimum time duration and the shortest interval of intermission of the ON-state are limited by the mirror response time.

Figure 4:
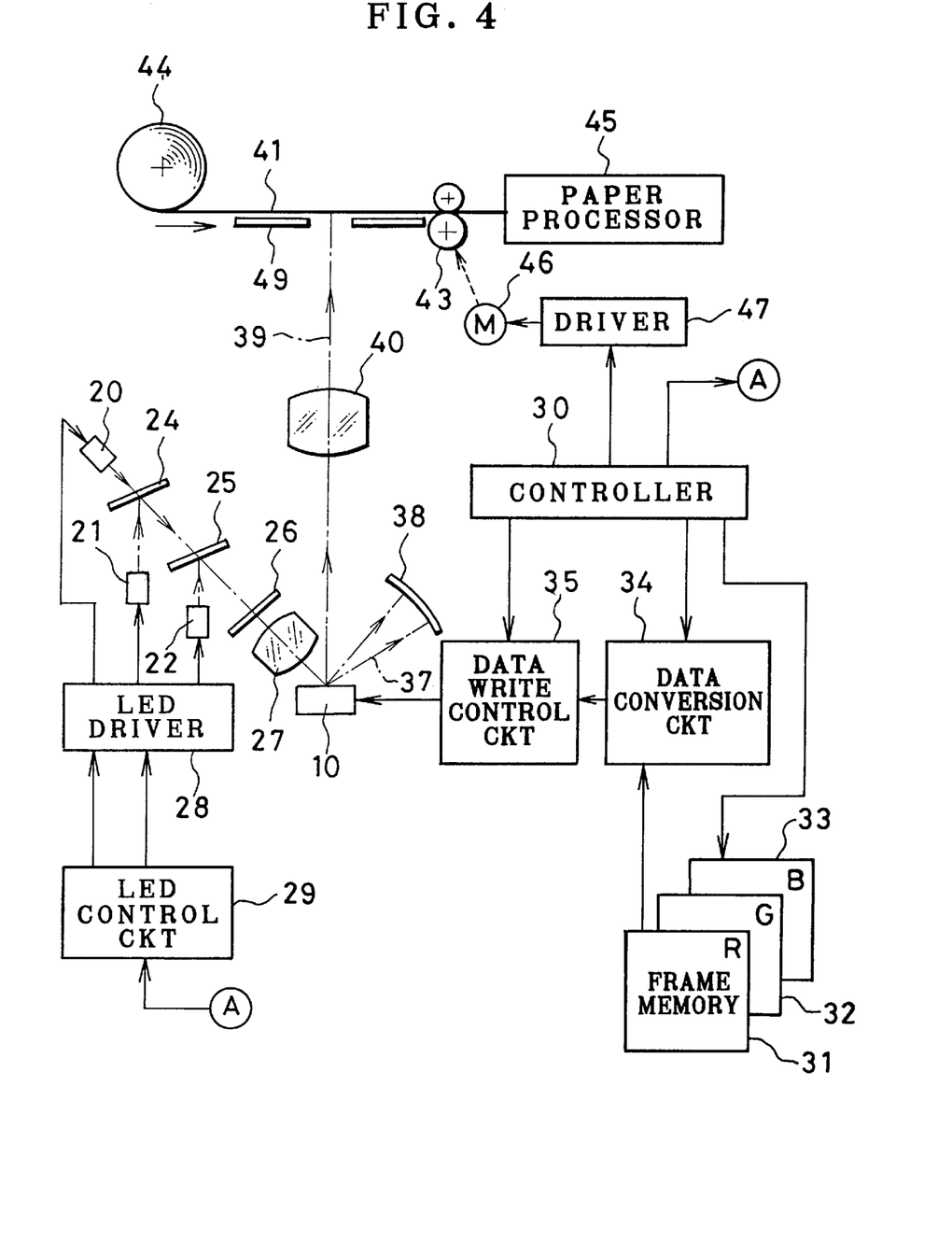
FIG. 4 is a block diagram of a printer using the digital micromirror device.

FIG. 4 shows a digital color printer with the DMD 10. As a light source for illuminating the DMD 10, there are red, green and blue LED devices 20, 21 and 22, each consisting of a row of LED segments. According to the present invention, the exposure time is controlled by controlling the ON-OFF states of the LED devices 20 to 22 in combination with the ON-OFF states of the DMD 10. As the response time of the LED necessary for switching over between ON and OFF states is relatively short, e.g. about 1/10 of the response time of the DMD 10, the method of the invention permits controlling the exposure by a shorter unit of time than that is possible by the ON-OFF control of the DMD 10 alone.

A dichroic mirror 24 that reflects green light only, a dichroic mirror 25 that reflects blue light only, and a diffusion plate 26 are disposed in an illumination light path that is incident on the DMD 10 at a given angle. The red light from the red LED device 20 travels through the dichroic mirrors 25 and 26, and is diffused through the diffusion plate 26. The diffused red light is converted into a parallel light bundle through a lens 27, and then falls on the DMD 10. The green light from the green LED device 21 is deflected by the dichroic mirror 24 toward the illumination light path, and travels through the dichroic mirror 25, the diffusion plate 26 and the lens 27 into the DMD 10. The blue light from the blue LED device 22 is deflected by the dichroic mirror 25 toward the illumination light path, and travels through the diffusion plate 26 and the lens 27 into the DMD 10. Thus, the light of each color equally illuminates the mirror array 11 of the DMD 10.

An LED driver 28 sequentially and periodically drives the three color LED devices 20 to 22 under the control of an LED control circuit 29 that functions as a light source modulator. A controller 30 sequentially controls the entire parts of the digital color printer. The controller 30 generates timing pulses to the LED control circuit 29. Based on the timing pulses, the LED control circuit 29 sends an LED drive signal to the LED driver 28, to control the ON-OFF of the selected one of the three LED devices 20 to 22. The timing pulses are also sent to a data write control circuit 35.

Frame memories 31, 32 and 33 respectively store red, green and blue digital image data of one frame which constitutes a full-color image. The image data is read from the three color frame memories 31 to 33 in a three color line sequential fashion: red image data of one line is read from the red frame memory 31, then green image data of one line from the green frame memory 32, and then blue image data of one line from the blue frame memory 33. The three color image data of one line is converted into mirror drive data through a data conversion circuit 34 color by color. The mirror drive data for each color of one line is color-sequentially fed to the data write control circuit 35.

To record one line, the data write control circuit 35 first writes the mirror drive data for red in the corresponding memory cells 14*a* of the DMD 10 bit-by-bit in the order from the most to the least significant bits of the mirror drive data of each pixel at the timings based on the timing pulses, so as to control the exposure amount of each red pixel by a pulse width modulation. Next, the data write control circuit 35 writes the mirror drive data for green in the DMD 10 in the same way as for red, so as to control the exposure amount of each green pixel by the pulse width modulation. Then, the mirror drive data for blue is written in the DMD 10 in the same way, to control the exposure amount of each blue pixel by the pulse width modulation.

When the micromirror 12 is in the OFF-state tilt by $-\theta$ responsive to the mirror drive data of "0", the illumination light is deflected toward a light elimination path 37, and is absorbed into a light absorbing plate 38. When the micromirror 12 is in the ON-state tilt by $+\theta$ responsive to the mirror drive data of "1", the illumination light is deflected toward an imaging light path 39. An imaging lens 40 is disposed in the imaging light path 40, to form a light spot or an image of the ON-state micromirror 12 on a photographic material 41, e.g. conventional silver-salt photographic paper. Each light spot provides a pixel on the photographic paper 41 at a recording density varying dependent upon the exposure amount.

Figure 5:
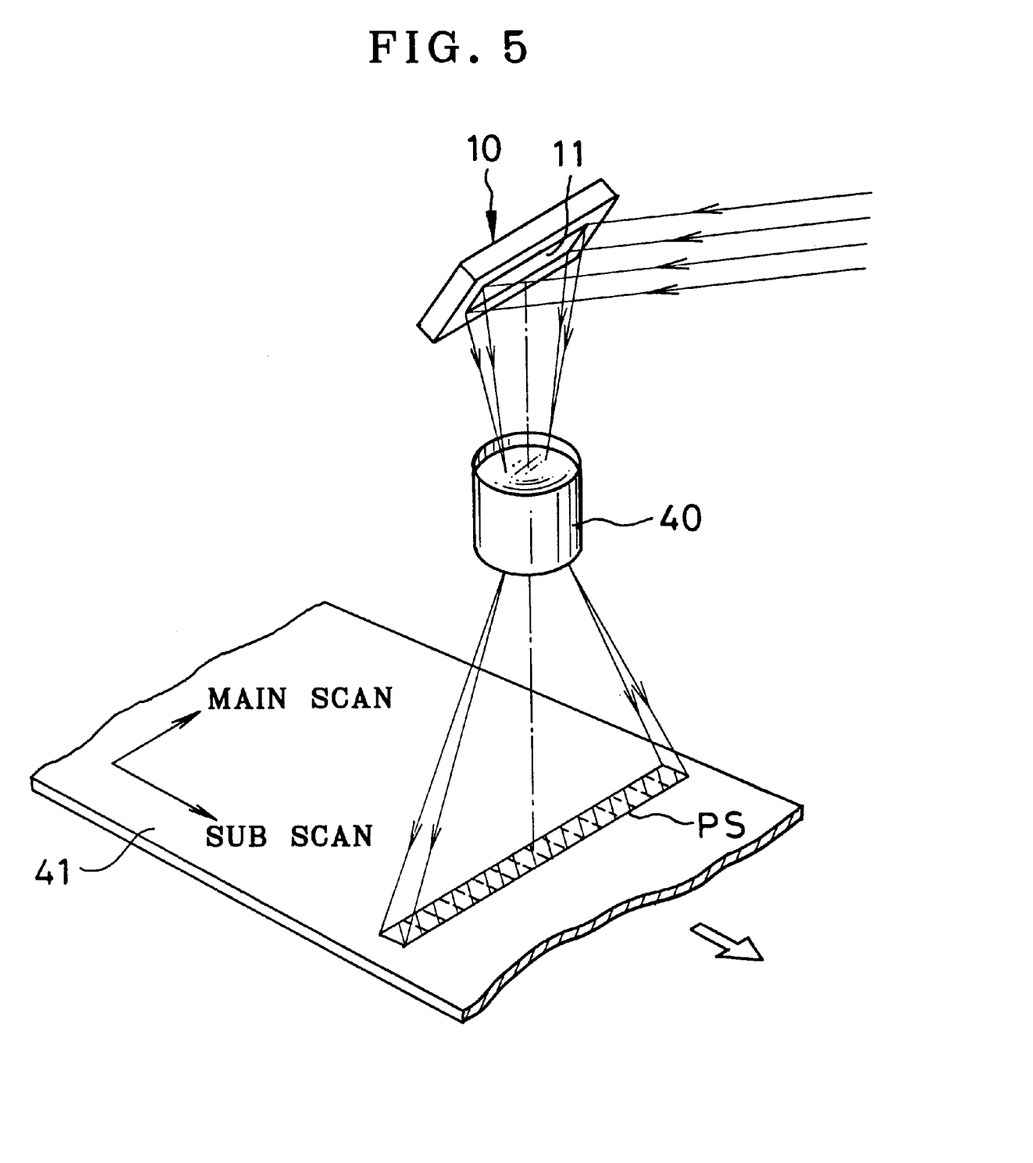
FIG. 5 is an explanatory perspective view showing the digital micromirror device in relation to a photographic paper.

As shown in FIG. 5, the one-row mirror array 11 of the DMD 10 extends in a main scan direction, whereas the photographic paper 41 is transported in a sub scan direction perpendicular to the main scan direction. Thus, the light beams reflected from the ON-state micromirrors 12 of the mirror array 11 and projected through the imaging lens 40 onto the photographic paper 41 form square images of these micromirrors 12 aligned in the main scan direction. Each square image corresponds to a pixel area PS. In the full-color printing of this embodiment, at most three color dots are recorded one upon another in one pixel area PS, so the three color dots can be called red, green and blue pixels.

Figure 6:
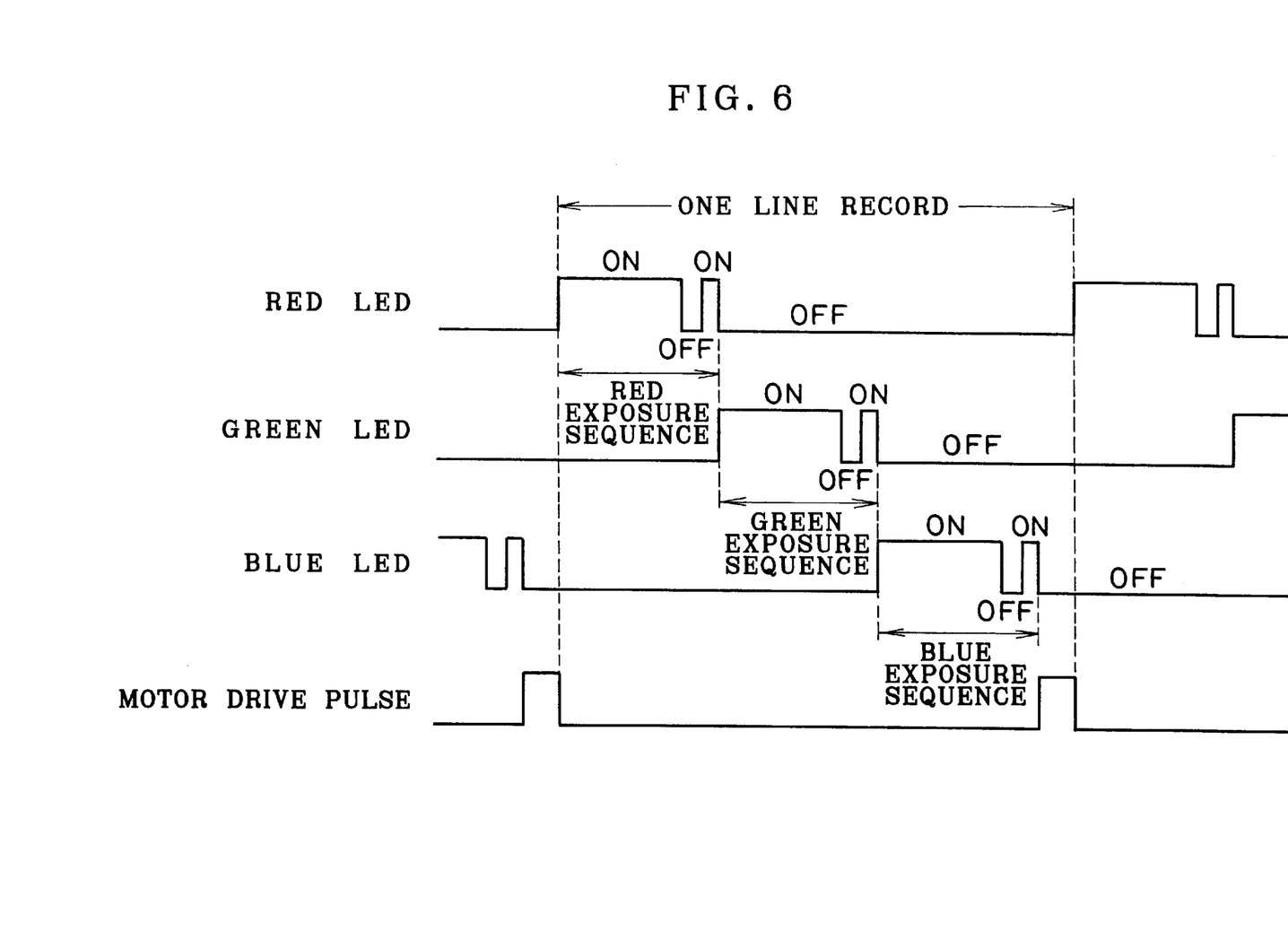
FIG. 6 shows timing charts of one line recording consisting of three color exposure sequences.

The photographic paper 41 is transported intermittently by one-line amount by rollers 43 from a supply roll 44 to a paper processor 45. During the intermission of transport, three color dots of one line are recorded on the photographic paper 41 by a color-sequential exposure as shown in FIG. 6. Thus, one full-color image frame is recorded line by line while the photographic paper 41 is transported by one-frame amount in the sub scan direction. The rollers 43 are rotated by a pulse motor 46 which is driven by a driver 47 under the control of the controller 30. The paper processor 45 develops the recorded image in a conventional manner. Designated by 49 is a paper mask.

Figure 7:
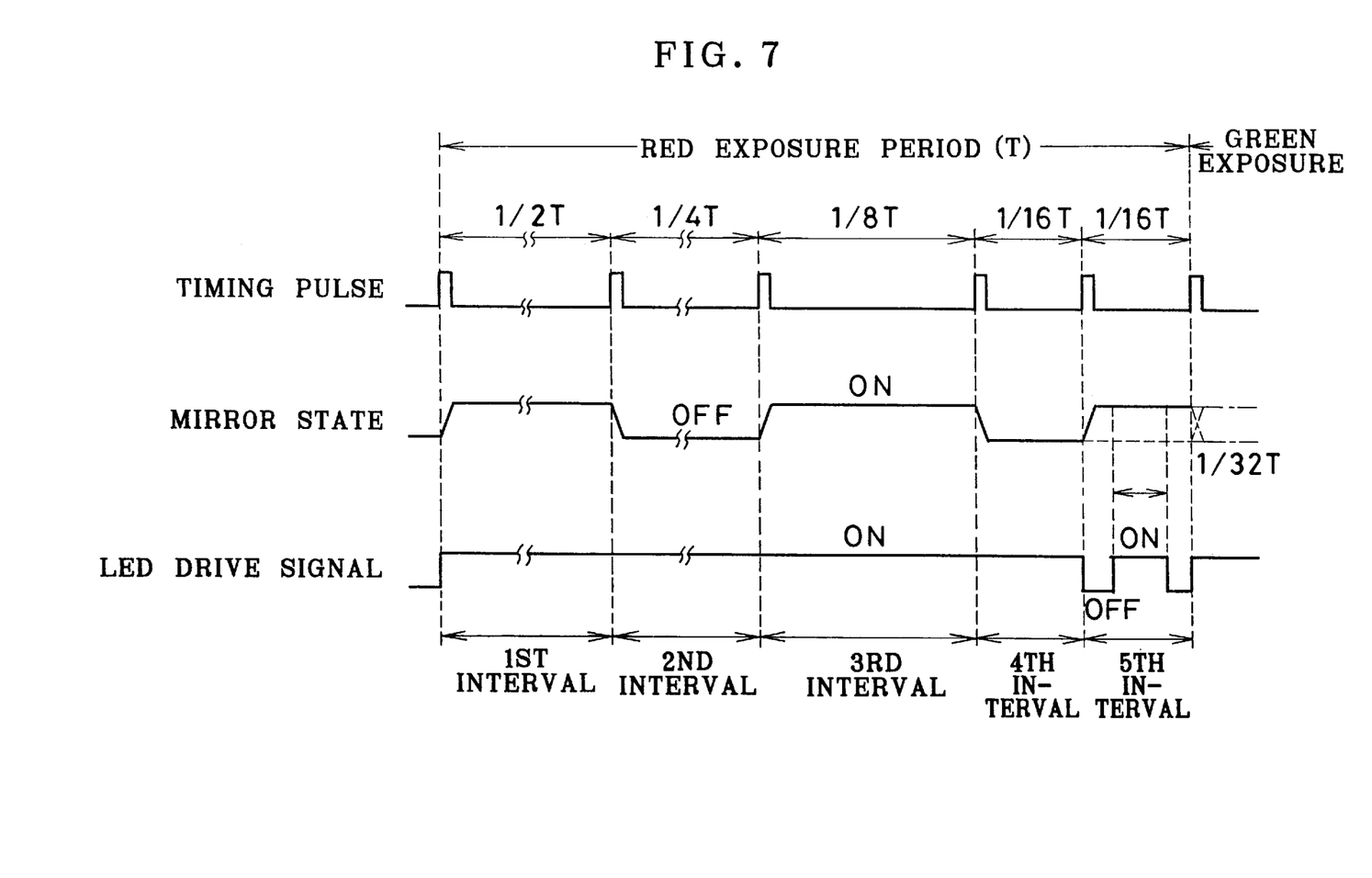
FIG. 7 shows timing charts of a red color exposure sequence according to an embodiment of the invention, using the digital micromirror device shown in FIG. 1.

Now, the operation of the above described digital printer will be described with reference to FIGS. 6 and 7.

When the power is supplied, the controller 30 orders the data write circuit 35 to clear the DMD 10, so the data write circuit 35 writes binary data "0" in all memory cells 14*a* of the SRAM 14 to tilt all micromirrors 12 of the mirror array 11 by $-\theta$, to reset them to the OFF-state as shown in FIG. 3B.

Then, the controller 30 applies motor drive pulses to the motor driver 47 to move the photographic paper 41 to a recording start position where a front end of one frame recording area, i.e. the first line recording position of one frame, is in the imaging light path 39. When the photographic paper 41 moves in the recording start position, the controller 30 stops the photographic paper 41 and starts recording the first line of one frame. First, the controller 30 effects a red exposure sequence, whereby the red image data of the first line is sent from the red frame memory 31 to the data conversion circuit 34. The data conversion circuit 34 converts the red image data into mirror drive data, e.g. 5-bit mirror drive data per pixel.

The data conversion circuit 34 sends the most significant bits of the 5-bit mirror drive data for red pixels of the first line to the data write control circuit 35. The data write control circuit 35 writes the binary values of the most significant bits as the 1-bit mirror drive data in the individual memory cells 14*a* of the DMD 10 synchronously with the first timing pulse in this red exposure sequence. In result, those micromirrors 12 of the mirror array 11 which the associated memory cells 14*a* are written with "1" are set in the ON-state, and other micromirrors 12 stay in the OFF-state.

On the other hand, in response to the first timing pulse, the LED control circuit 29 outputs a switching signal to the LED driver 28 to designate the red LED device 20 and, simultaneously, sends the LED drive signal to the LED driver 28. Thereby, the red LED device 20 is driven to project red light onto the DMD 10. The red light incident on the ON-state micromirrors 12 is directed to the imaging light path 39 and is focused through the imaging lens 40 onto the photographic paper 41. As a result, a pattern of red light spots are formed in a line on the first line recording position in correspondence with the bit pattern of the most significant bits of the 5-bit mirror drive data for red of the first line. The photographic paper 41 is exposed to the red light spots for a time substantially equivalent to a predetermined time interval ½·T from the first timing pulse to the second timing pulse in the red exposure sequence, wherein T is a time period given to one red exposure sequence. In this way, a first stage of the red exposure sequence is accomplished, and a second stage of the red exposure sequence starts from the second timing pulse.

In response to the second timing pulse, the memory cells 14a are rewritten with the second significant bits of the respective 5-bit mirror drive data of the first line. Then, those micromirrors 12 assigned "0" as the 1-bit mirror drive data change over from the ON-state to the OFF-state, or stay in the OFF-state, whereas those assigned "1" as the 1-bit mirror drive data changes over from the OFF-state to the ON-state, or stay in the ON-state. The LED control circuit 29 continues to output the LED drive signal to the LED driver 28 in the second stage, so that the red light is reflected from the ON-state micromirrors 12 to form a line of red light spots on the first line recording position, whose pattern corresponds to the bit pattern of the second significant bits of the first line. The second stage is terminated at the third timing pulse which is generated at a time interval of ¼·T from the second timing pulse. Thus, the photographic paper 41 is exposed for about ¼·T in the second stage.

In a third stage of the red exposure sequence starting from the third timing pulse, the micromirrors 12 are driven by the third significant bits of the respective 5-bit mirror drive data of the first line, in the same way as in the first and second stages. The fourth timing pulse is generated at a time interval of ⅛·T from the third timing pulse, to terminate the third stage and start a fourth stage of the red exposure sequence in accordance with the fourth significant bits of the respective 5-bit mirror drive data of the first line. The fifth timing pulse is generated at a time interval of 1/16·T from the fourth timing pulse, to terminate the fourth stage and start a fifth stage of the red exposure sequence.

In this way, from the first to fourth stages, the ON-OFF states and the time duration of the ON-state of each micromirror 12 is controlled in accordance with the first to fourth significant bits of the assigned 5-bit mirror drive data, to change the exposure time per pixel in 16 steps, one step being 1/16·T, as a combination of the times ½·T, ¼·T, ⅛·T and 1/16·T of the respective stages.

In the fifth stage, the LED control circuit 29 first stops the LED drive signal, to turn the red LED device 20 off at the beginning. Simultaneously, the data write control circuit 35 writes the least significant bits of the 5-bit mirror drive data of the first line in the respective memory cells 14a of the SRAM 14, so that the micromirrors 12 are set to the ON-state or the OFF-state in accordance with the least significant bits of the mirror drive data.

A predetermined time after the receipt of the fifth timing pulse, the LED control circuit 29 sends the LED drive signal to the LED driver 28 only for a limited time 1/32·T. Thereby, the red LED device 20 projects light for the time 1/32·T, so that the ON-state micromirrors 12 expose the photographic paper 41 to the red light only for the time 1/32·T in the fifth stage. Consequently, the total exposure time per pixel from the first to fifth stages of the red exposure sequence is changed in 32 steps, one step being 1/32·T, in accordance with the assigned 5-bit mirror drive data. Thus, the total amount of red exposure per pixel is controlled in 32 steps, recording a line of red pixels with 32 tonal levels on the first line recording position of the photographic paper 41.

The time lag from the fifth timing pulse to the restart or re-sending of the LED drive signal in the fifth stage is predetermined such that the micromirrors 12 can complete moving from the OFF-state to the ON-state, or vise versa, within this time lag. That is, the time lag is determined to be longer than the response time of the micromirror 12. As described above, the shortest possible DMD drive interval is limited by the mirror response time. Therefore, where the exposure is controlled only by the ON-OFF state and time of the micromirrors 12, the minimum unit of controllable exposure time is limited to the shortest possible DMD drive interval, e.g. 1/16·T. But, by driving the LED device for a shorter time, e.g. 1/32·T, than the shortest possible DMD drive interval, the present invention makes it possible to control the exposure time by a smaller unit and hence in a larger number of steps than the conventional exposure control method wherein only the DMD 10 is controlled.

Immediately after accomplishing the red exposure sequence for the first line, the controller 30 starts a green exposure sequence for the first line. In a first stage of the green exposure sequence, the controller 30 sends the green image data of the first line from the green frame memory 32 to the data conversion circuit 34. The data conversion circuit 34 converts the green image data of each pixel of the first line into 5-bit mirror drive data. Thereafter, the most significant bits of the 5-bit mirror drive data for green of the first line is sent to the data write control circuit 35. The data write control circuit 35 writes the most significant bits in the memory cells 14a at the timing of the first timing pulse in this green exposure sequence. Also in response to the first timing pulse, the LED control circuit 29 sends a switching signal to the LED driver 28 to designate the green LED device 20 and, simultaneously outputs the LED drive signal to the LED driver 28. Thus, the green LED device 21 turns ON.

In result, a line of green light spots are formed on the first line recording position of the photographic paper 41 in accordance with the ON-OFF states of the micromirrors 12 determined by the most significant bits written in the memory cells 14a, for a predetermined time interval ½·T from the first timing pulse to the second timing pulse in the green exposure sequence, wherein T is a time period given to one red exposure sequence. In this way, a first stage of the green exposure sequence is executed in the same way as the first stage of the red exposure sequence. Thereafter, second to fifth stages of the green exposure sequence are executed based on the second to fifth timing pulses of this sequence, in the same way as in the red exposure sequence. That is, in the fifth stage of the green exposure sequence, the green LED device 21 is turned OFF for a time in the beginning, while the micromirrors 12 are switched over in accordance with the least significant bits of the mirror drive data for green of the first line. Thereafter, the green LED device 21 is turned ON only for a time 1/32·T, so that the green light exposure amount is controlled in 32 steps.

Following the green exposure sequence, a blue exposure sequence for the first line recording is executed in the same way as the red and green exposure sequences, in accordance with the blue image data of the first line read from the blue frame memory 22. At the end of the blue exposure sequence, the controller 30 outputs a motor drive pulse to the motor driver 47 to rotate the pulse motor 46 by one step to advance the photographic paper 41 one line amount.

Thereafter, three color exposures are sequentially executed for recording the second line in accordance with the three color image data of the second line, in the same way as for the first line. The same three color exposure sequences as above are repeated periodically after each one-line advance of the photographic paper 41, to record the full-color image frame as a latent image on the photographic paper 41. The latent image is developed in the paper processor 45 in a conventional manner.

When the photographic paper 41 is positive-to-positive type, data of positive images are utilized for driving the DMD 10. When the photographic paper 41 is negative-to-positive type, data of negative images are utilized for driving the DMD 10.

As described so far, since the exposure time is controlled by a smaller unit than the shortest possible DMD drive interval that is limited by the response time of the micromirror, the number of tonal levels is increased without the need for lowering the print speed, even with the single-row mirror array 11.

Figure 8:
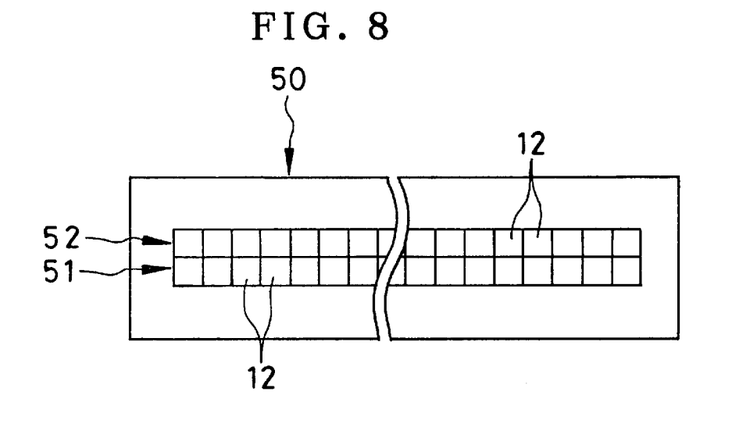
FIG. 8 is a schematic top plan view of a digital micromirror device having two rows of micromirrors.
Figure 9:
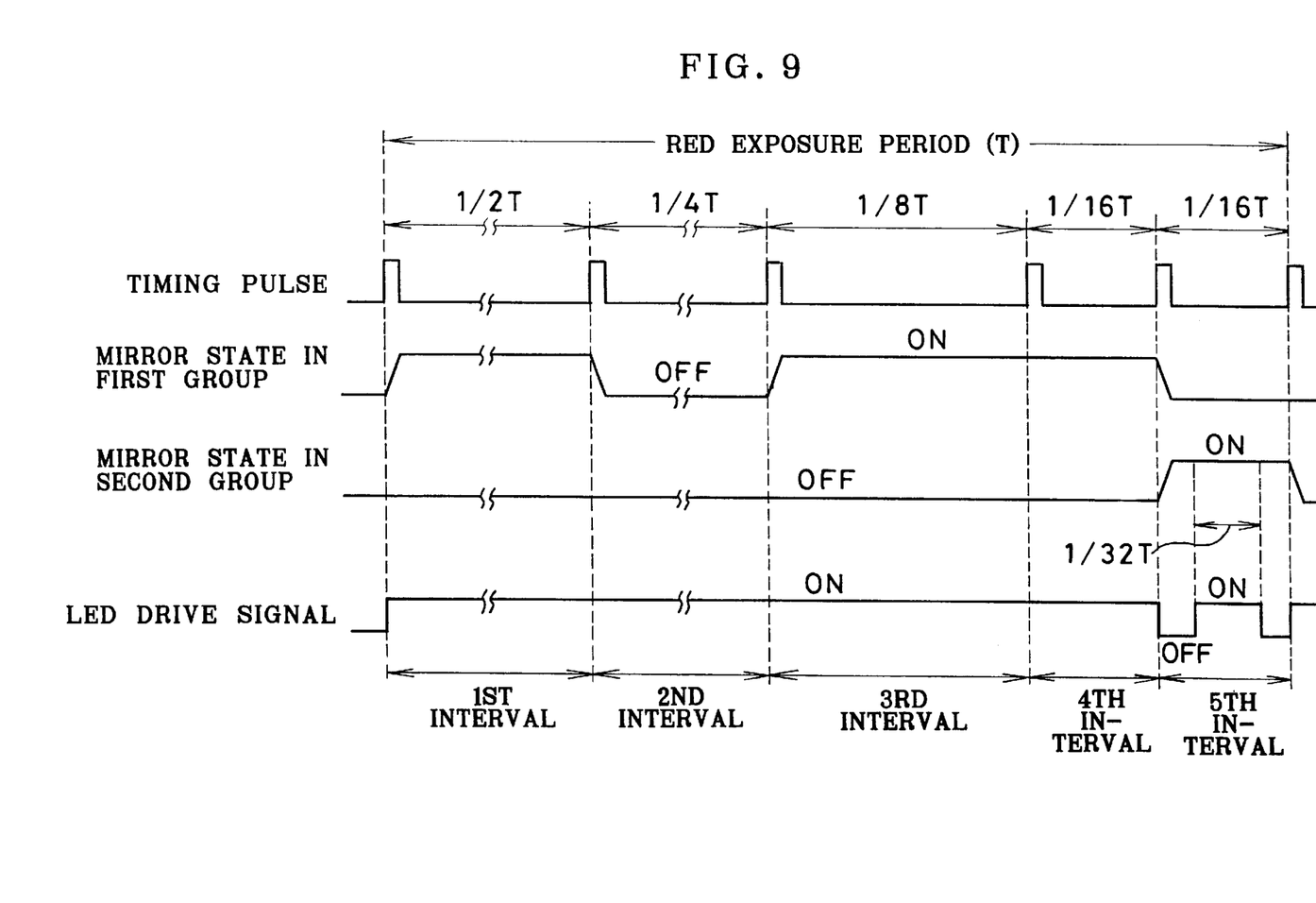
FIG. 9 shows timing charts of a red color exposure sequence according to another embodiment of the invention, using the digital micromirror device shown in FIG. 8.
Figure 10A:
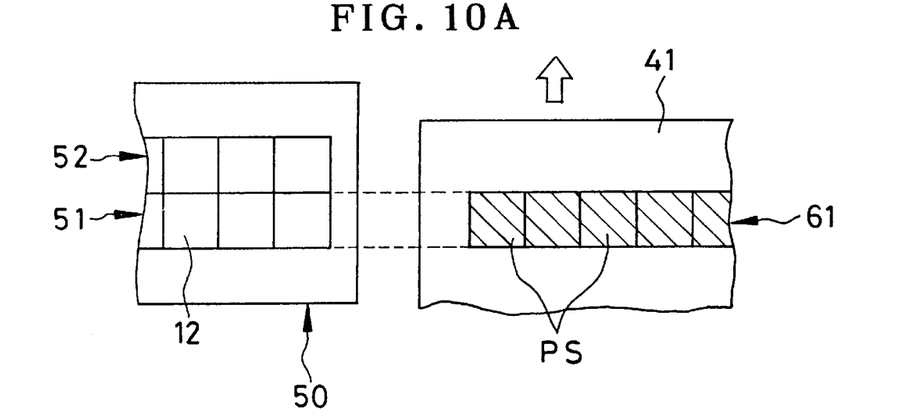
FIGS. 10A, 10B and 10C are explanatory views illustrating recording conditions on the photographic paper by the digital micromirror device shown in FIG. 8.
Figure 10B:
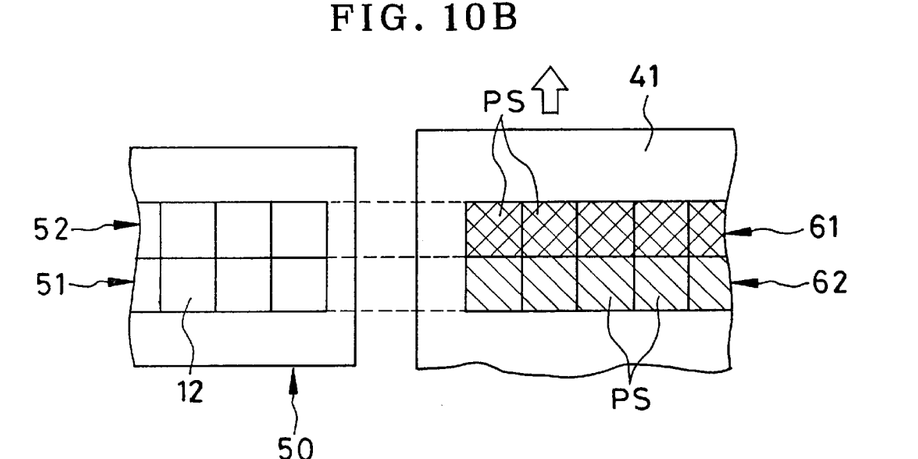
Figure 10C:
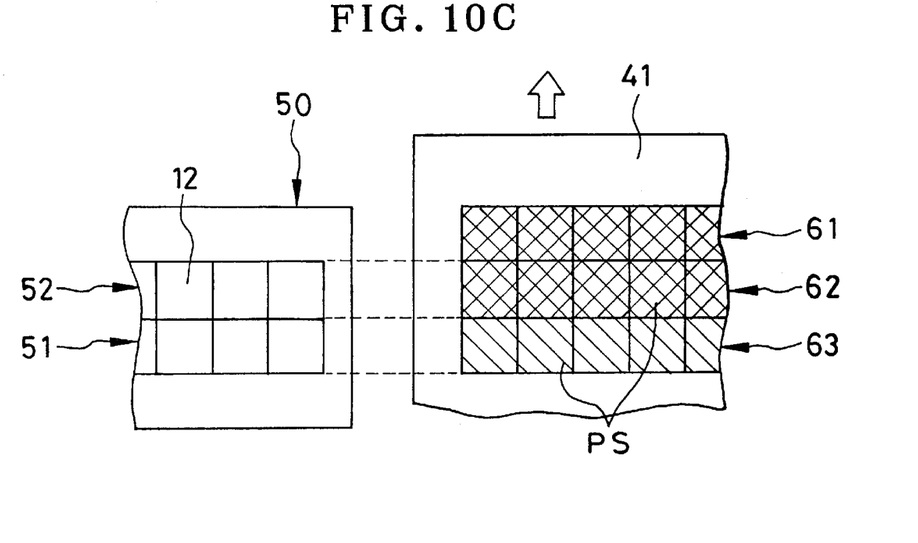

FIGS. 8 to 10 show another embodiment of the present invention which uses a DMD 50 with two rows of micromirrors 12 as a SLM for a digital printer. Other configurations of the digital printer are fundamentally equal to those shown in FIG. 4, so that the same terms and reference numbers will be used for those devices of the second embodiment which have similar functions to those of the first embodiment.

As shown in FIG. 8, the micromirrors 12 of the DMD 50 are arrayed in two rows 51 and 52. The light beams reflected from the ON-state micromirrors 12 of the first and second rows 51 and 52 form two lines of light spots at one time in the main scan direction on the photographic paper 41. Hereinafter, the micromirrors 12 in the first row 51 will be called a first mirror group 51, and the micromirrors 12 in the second row 51 will be called a second mirror group 52.

A data conversion circuit 34 reads out image data of two adjacent lines at one time from one of three color frame memories 31 to 33, and converts the image data of two lines into primary and secondary mirror drive data, e.g. 5-bit data per pixel. For example, in one red exposure sequence, red image data of the Mth and (M−1)th lines, M being a positive integer, is read out from the red frame memory 31, and is converted into primary and secondary mirror drive data respectively. The primary and secondary mirror drive data is used for driving the first and second mirror groups 51 and 52 respectively.

Specifically, the data conversion circuit 34 allots "1" or "0" to the most to fourth significant bits of the first mirror data in accordance with the red image data of the Mth line, and allots "0" to the least significant bit of the first mirror data regardless of the red image data. As for the secondary mirror drive data, "0" is allotted to the most to fourth significant bits regardless of the red image data of the (M−1) line, and "1" or "0" is allotted to the least significant bit depending upon the red image data of the (M−1) line. In the next red exposure sequence, the primary and secondary mirror drive data is obtained from the red image data of the (M+1)th and M lines in the same way as above. The frame memories 31 to 33 store dummy data as zero line image data of the respective colors. The dummy data has an ineffective value for coloring, so that every bit of the mirror drive data obtained from the zero line image data is always "0".

The data write control circuit 35 writes the primary mirror drive data in those memory cells of the DMD 50 which are associated with the first mirror group 51, in the order from the most to least significant bits, synchronously with timing pulses from the controller 30, as shown in FIG. 9, in the same way as in the first embodiment. In the same way, the most to least significant bits of the secondary mirror drive data are sequentially written in those memory cells which are associated with the second mirror group 52, synchronously with the timing pulses.

For example, to record the first line of one frame, a first line recording position 61 of the photographic paper 41 is placed in the imaging light path of the first mirror group 51, as shown in FIG. 10A. The data write control circuit 35 sequentially writes the most significant bits of the primary mirror drive data in the memory cells for the first mirror group 51 at the intervals of the first timing pulse generated in the first red exposure sequence. In result, the micromirrors 12 of the first mirror group 51 take the ON- or OFF-states, so that some pixel areas PS of the first line recording position 61 are exposed to red light projected from a red LED device 20, for a time, e.g. ½·T, that is given to the first stage of each red exposure sequence, and other pixel areas PS of the first line recording position 61 are not exposed.

In the same way as for the first significant bit, the second to fourth significant bits of the primary mirror drive data are sequentially written in the memory cells of the first mirror group 51 at the intervals of the second to fourth timing pulses, to expose the respective pixel areas PS of the first line recording position 61 for different times in accordance with the red image data of the first line.

Responsive to the fifth timing pulse in the first red exposure sequence, the least significant bits of the primary mirror drive data are written in the memory cells of the first mirror group 51. Simultaneously, a LED control circuit 29 controls a LED driver 28 to interrupt the light projection from a red LED device 20 temporarily, and then drive the red LED device 20 for a given time, e.g. 1/32·T, that is shorter than the shortest possible DMD drive interval, e.g. 1/16·T. Since the least significant bits of the primary mirror drive data are always "0", every micromirror 12 of the first mirror group 51 takes the OFF-state. Therefore, no exposure is made to the first line recording position 61 in the fifth stage of the first red exposure sequence, even through the red LED device 20 is turned ON for the given time 1/32·T.

On the other hand, since the mirror drive data for the zero line is always "0", the micromirrors 12 of the second mirror group 52 always take the OFF-state throughout the first red exposure sequence. Accordingly, no red image is recorded on the photographic paper 41 before the first line recording position 61.

Thereafter, the green exposure sequence is conducted in the same way as the red exposure sequence, on the basis of the green image data of the first line and the dummy data for the zero line. And then, the blue exposure sequence is conducted in the same way as the red exposure sequence, on the basis of the blue image data of the first line and the dummy data for the zero line. Since the mirror drive data for the zero line always takes the value "0" in the first green exposure sequence and the first blue exposure sequence as well, no dot is recorded before the first line recording position 61. In result, as shown in FIG. 10A, the pixel areas PS of the first line position 61 are is exposed up to different degrees in accordance with the assigned first to fourth bits of the red, green and blue image data of the first line.

After the first three color exposure sequences, the photographic paper 41 is advanced by one line in the sub scan direction as shown by an arrow in FIG. 10A, to place the first line recording position 61 in the imaging light path of the second mirror group 52, and the second line recording position 62 in the imaging light path of the first mirror group 51, as shown in FIG. 10B. Then, the second red exposure sequence starts in the same way as the first red exposure sequence, but on the basis of primary and secondary mirror drive data obtained from the red image data of the second and first lines.

The data write control circuit 35 sequentially writes the memory cells of the first mirror group 51 with the most to fourth significant bits of the primary mirror drive data obtained from the red image data of the second line synchronously with first to fourth timing pulses. In correspondence with the most to fourth significant bits of the primary mirror drive data, pixel areas PS of the second line recording position 62 are exposed up to different degrees in the first to fourth stage of the second red exposure sequence.

Also, synchronously with the first to fourth timing pulses, the most to fourth significant bits of the secondary mirror drive data are sequentially written in the memory cells of the second mirror group 52. Since the most to fourth significant bits of the secondary mirror drive data are always "0" regardless of the image data, every micromirror 12 of the second mirror group 52 stay in the OFF-state, so that the first line recording position 61 is not exposed in the first to fourth stage of the second red exposure sequence.

Responsive to the fifth timing pulse in the second red exposure sequence, the least significant bits of the primary mirror drive data are written in the memory cells of the first mirror group 51. Since the least significant bits of the primary mirror drive data are always "0" regardless of the image data, every micromirror 12 of the first mirror group 51 takes the OFF-state in the fifth stage of the second red exposure sequence. Therefore, no exposure is made to the second line recording position 62 in the fifth stage, even through the red LED device 20 is turned ON for the given time, e.g. $\frac{1}{32}$·T. In result, the pixel areas PS of the second line recording position 62 are exposed up to different degrees in the second red exposure sequence in correspondence with the most to fourth significant bits of the primary mirror drive data that is obtained from the red image data of the second line.

On the other hand, the micromirrors 12 of the second mirror group 52 take the ON- or OFF-states in the fifth stage of the second red exposure sequence depending upon the least significant bits of the secondary mirror drive data which take "1" or "0" in accordance with the red image data of the first line. Accordingly, in the fifth stage of the second red exposure sequence, those pixel areas PS of the first line recording position 61 which are optically connected to the ON-state micromirrors 12 are exposed for the given time $\frac{1}{32}$·T. In this way, red light exposure time for the first line recording position 61 is controlled in 32 steps, so that red dots are recorded in the pixel areas PS of the first line recording position 61 at different densities among the 32 tonal levels.

Thereafter, the second green exposure sequence is conducted in the same way as the second red exposure sequence, on the basis of the green image data of the first and second lines. And then, the second blue exposure sequence is conducted in the same way as the second red exposure sequence, on the basis of the blue image data of the first and second lines. In result, green and blue dots are recorded in the pixel areas PS of the first line recording position 61 at different densities among the 32 tonal levels, in addition to the red dots.

After the second three color exposure sequences, the photographic paper 41 is advanced by one line, to place the second line recording position 62 in the imaging light path of the second mirror group 52, and the third line recording position 63 in the imaging light path of the first mirror group 51, as shown in FIG. 10C. The third red exposure sequence, the third green exposure sequence and the third blue exposure sequence are conducted in the same way as the second three color exposure sequences, but on the basis of image data of the second and third lines. That is, the first mirror group 51 is driven by primary mirror drive data whose most to fourth significant bits are determined by the image data of the third line, while the second mirror group 52 is driven by secondary mirror drive data whose least significant bits are determined by the image data of the second line. Exposure time for the fourth and following line recording positions is controlled respectively in 32 steps in the same way as for the preceding line recording positions 61 to 63.

As described so far, the second embodiment using the DMD 50 with the double-row micromirror array achieves the same effect as the first embodiment using the DMD 10 with the single-row mirror array 11. In addition, the second embodiment allows to drive the micromirrors 12 of the second mirror group 52 at an appropriate timing regardless of the response time of the micromirrors 12, so that it is possible to increase the number of available tonal levels without lowing the print speed, even when the response speed of the micromirrors 12 is relatively low. Alternatively, by use of high speed micromirrors, it is possible to achieve a fine gradation printing at a high speed without the need for a mirror array having a greater number of micromirror rows.

Figure 11:
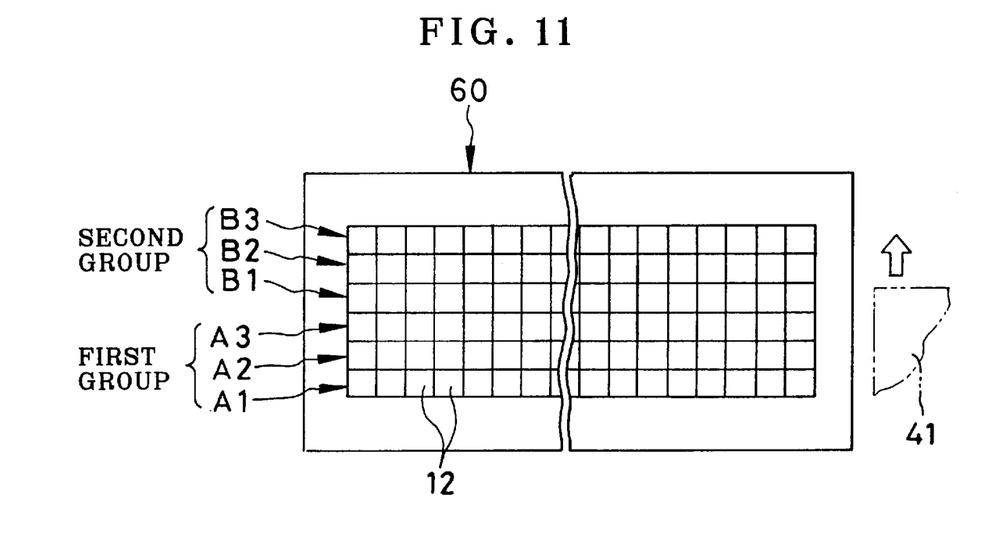
FIG. 11 is a schematic top plan view of a digital micromirror device having six rows of micromirrors.

FIG. 11 shows a DMD 60 which has a mirror array consisting of six rows of micromirrors 12, of which first three rows A1, A2 and A3 constitute a first mirror group, whereas other three rows B1, B2 and B3 constitute a second mirror group. With this DMD 60, a digital printer can transport photographic paper one line after one color exposure sequence, so that the print speed is still more increased. Other configurations of the digital printer may be fundamentally equal to those shown in FIG. 4, so that the same terms and reference numbers will be used for those devices of the third embodiment which have similar functions to those of the first embodiment.

In each color exposure sequence, image data of successive six lines is read out from one of three color frame memories 31 to 33. For example, in a red exposure sequence, red image data of the Mth to (M−5)th lines, M being a positive integer, is sent to a data conversion circuit 34. The data conversion circuit 34 converts the red image data of the M th to (M−2)th lines into 5-bit mirror drive data such that the most to fourth significant bits of the mirror drive data take the value "1" or "0" depending upon the red image data, and the least significant bit always takes the value "0" regardless of the image data.

On the other hand, the data conversion circuit 34 converts the red image data of the (M−3)th to (M−5)th lines into 5-bit mirror drive data such that the most to fourth significant bits of the mirror drive data always take the value "0" regardless of the image data, and the least significant bit takes the value "1" or "0" depending upon the red image data. Also in this embodiment, either of the three frame memories 31 to 32 stores dummy data as image data for those lines whose number of order is less than first. The dummy data is always converted into mirror drive data of "0".

A data write control circuit 35 writes the mirror drive data obtained from the red image data of the Mth line in those memory cells which are associated with the micromirrors 12 of the first row A1, and the mirror drive data obtained from the red image data of the (M−1)th line in those memory cells which are associated with the micromirrors 12 of the second row A2. The mirror drive data obtained from the red image data of the (M−2)th line is written in those memory cells which are associated with the micromirrors 12 of the third row A3.

On the other hand, the mirror drive data obtained from the red image data of the (M−3)th line is written in those memory cells which are associated with the micromirrors 12 of the fourth row B1. The mirror drive data obtained from the red image data of the (M−4)th line is written in those memory cells which are associated with the micromirrors 12 of the fifth row B2, and the mirror drive data obtained from the red image data of the (M−5)th line is written in those memory cells which are associated with the micromirrors 12 of the sixth row B3.

From the first to fourth stages of the red exposure sequence, a red LED device 20 continues being driven, so that the Mth to (M−2)th line recording positions of photographic paper 41 are exposed to the red light through the ON-state micromirrors 12 of the first mirror group, i.e. of the first to third rows A1 to A3, for different times in accordance with the most to fourth significant bits of the mirror drive data allotted thereto, in the same way as described with reference to FIG. 9. Thus, exposure time per pixel is controlled by the unit of $\frac{1}{16} \cdot T$ in the first to fourth stages. On the other hand, the micromirrors 12 of the second mirror group, i.e. of the fourth to sixth rows B1 to B3 stay in the OFF-state in the first to fourth stages, since all of the most to fourth significant bits of the mirror drive data allotted thereto are "0".

In the fifth stage of the red exposure sequence, the micromirrors 12 of the second mirror group take the ON- or OFF-state depending upon the least significant bit of the mirror drive data therefor, while the red LED device 20 turns ON for $\frac{1}{32} \cdot T$. Thus, the (M−3)th to (M−5)th line recording positions are exposed to the red light for $\frac{1}{32} \cdot T$ through the ON-state micromirrors 12 of the fourth to sixth rows B1 to B3. On the contrary, the micromirrors 12 of the first mirror group are all set to the OFF-state in the fifth stage.

After the red exposure sequence is accomplished, the photographic paper 41 is advanced one line, and then a green exposure sequence starts. In the green exposure sequence, green image data of the (M+1)th to (M−4)th lines is sent to a data conversion circuit 34. The data conversion circuit 34 converts the green image data of the (M+1)th to (M−1)th lines into 5-bit mirror drive data for the first mirror group, whose most to fourth significant bits are "1" or "0" depending upon the green image data, and whose least significant bit is always "0" regardless of the image data.

On the other hand, the data conversion circuit 34 converts the green image data of the (M−2)th to (M−4)th lines into 5-bit mirror drive data for the second mirror group, whose most to fourth significant bits are always "0" regardless of the image data, and whose least significant bit is "1" or "0" depending upon the green image data.

Accordingly, in the first to fourth stages of the green exposure sequence, the micromirrors 12 of the first to third rows A1 to A3 are driven in accordance with the green image data of the (M+1)th to (M−1)th lines respectively, while the micromirrors 12 of the second mirror group are kept in the OFF-state. In the fifth stage, the micromirrors 12 of the first mirror group are switched to the OFF-state, and the micromirrors 12 of the fourth to sixth rows B1 to B3 are driven in accordance with the green image data of the (M−2)th to (M−4)th lines respectively. Thereby, the (M−2)th to (M−4)th line recording positions of the photographic paper 41 are exposed for $\frac{1}{32} \cdot T$ through the ON-state micromirrors 12 of the fourth to sixth rows B1 to B3.

After the green exposure sequence, the photographic paper 41 is advanced one line, and a blue exposure sequence is conducted on the basis of blue image data of the (M+2)th to (M−3)th lines. In the first to fourth stages of the green exposure sequence, the micromirrors 12 of the first to third rows A1 to A3 are driven in accordance with the blue image data of the (M+2)th to Mth lines respectively, while the micromirrors 12 of the second group are kept in OFF-state. In the fifth stage, the micromirrors 12 of the first group are switched to the OFF-state, and the micromirrors 12 of the fourth to sixth rows B1 to B3 are driven in accordance with the blue image data of the (M−1)th to (M−3)th lines respectively.

In result of the above three color exposure sequences, three color dots are recorded on the Mth line recording position of the photographic paper 41 in accordance with the most to fourth significant bits of the mirror drive data obtained from the three color image data of the Mth line.

In the following red exposure sequence, the micromirrors 12 of the first mirror group are driven in the first to fourth stages on the basis of red image data of the (M+3)th to (M+1)th lines, and the micromirrors 12 of the second mirror group are driven in the fifth stage on the basis of the red image data of the Mth to (M−2)th lines, in the same way as set forth above. In the next green exposure sequence, the micromirrors 12 of the first mirror group are driven in the first to fourth stages on the basis of green image data of the (M+4)th to (M+1)th lines, and the micromirrors 12 of the second mirror group are driven in the fifth stage on the basis of the Mth to (M−1)th lines. Thereafter, a blue exposure sequence is conducted by driving the micromirrors 12 of the first mirror group on the basis of blue image data of the (M+5)th to (M+3)th lines in the first to fourth stages, and driving the micromirrors 12 of the second mirror group on the basis of the (M+2)th to Mth lines in the fifth stage.

Figure 12:
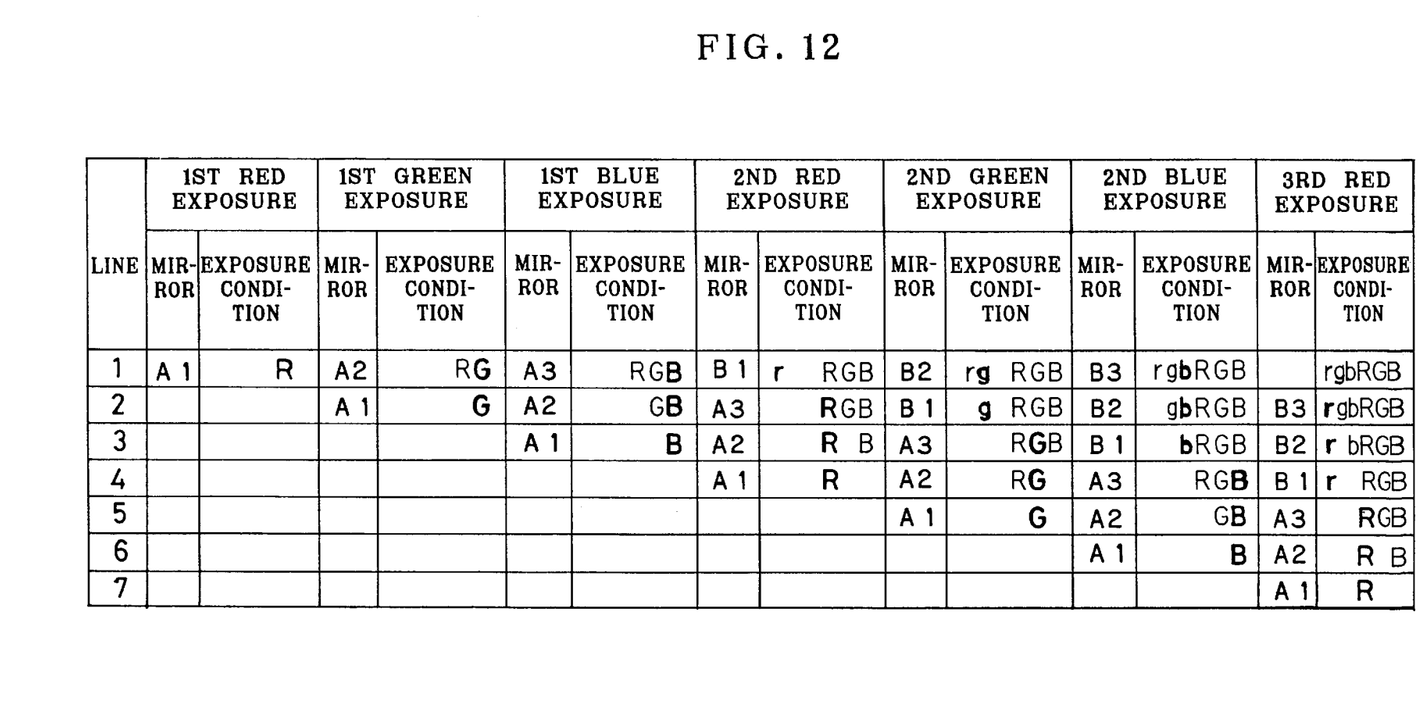
FIG. 12 is a diagram illustrating recording conditions on the photographic paper by the digital micromirror device shown in FIG. 11.

FIG. 12 shows an example of consequent recording conditions of the first to seventh line recording positions of the photographic paper 41 according to this embodiment. In FIG. 12, "R", "G" or "B" respectively indicates that the corresponding line recording position is exposed to red, green or blue light in the first to fourth stages through the ON-state micromirrors 12 of the first group. On the other hand, "r", "g" or "b" respectively indicates that the corresponding line is exposed to red, green or blue light for $\frac{1}{32} \cdot T$ in the fifth stage through the ON-state micromirrors 12 of the second group. Among these, bold-faced characters indicate which lines are exposed in the corresponding color exposure sequence.

In this way, each line recording position is exposed to the three color lights in the first to fourth stages of successive three color exposure sequences while it moves past the first mirror group consisting of the first to third rows A1 to A3, and then additionally exposed to the three color lights for $\frac{1}{32} \cdot T$ in the fifth stage of the following three color exposure sequences while it moves past the second mirror group consisting of the fourth to sixth rows B1 to B3. In result, exposure time to the individual pixel area PS of each line recording position is controlled in 32 steps for each color, to record one color dot with 32 tonal levels.

The third embodiment permits printing at a three times higher speed than that available for the first or the second embodiment where the photographic paper is advanced one line after every three color exposure sequences. Alternatively, the same print speed as the first or the second embodiment is available even with those micromirrors whose response speed is one-third the micromirrors of the first or the second embodiment.

Although either mirror group of the third embodiment consists of three rows of micromirrors, one or both mirror groups may have more than three micromirror rows. In that case, the number of rows of each mirror group should be a multiple of three so that the same number of exposure sequences may be carried out for each color on one line. Where each mirror group has nine rows, for example, it is possible to triple the print speed compared with the third embodiment. Moreover, the number of micromirror rows may be different between the first group and the second group.

In the above embodiments, each color exposure sequence has five stages, and the light source is driven for a limited time, i.e. $\frac{1}{32} \cdot T$, within the fifth stage which lasts for the shortest possible mirror drive interval, i.e. $\frac{1}{16} \cdot T$. However, it is possible to provide the sixth stage or more than six stages in each color exposure sequence, such that each of the stages following the fifth stage lasts for $\frac{1}{16} \cdot T$, and the light source is driven for a limited time, e.g. $\frac{1}{64} \cdot T$, $\frac{1}{128} \cdot T$, and so forth, in the middle of each of these later stages. This permits more fine gradation reproduction.

Although the above embodiments have been described on the assumption that the shortest possible mirror drive interval is $\frac{1}{16} \cdot T$ when T represents the time period given to one color exposure sequence, the present invention should not be limited to this assumption. For example, the shortest possible mirror drive interval may be $\frac{1}{32} \cdot T$. In that case, each color exposure sequence may have six or more stages, and the light source may be driven continuously from the first to fifth stages, and then for a limited time, e.g. $\frac{1}{64} \cdot T$, in the middle of the sixth stage. It is also possible to arrange from the shortest stage to the longest stage in the color exposure sequence.

The above embodiments modify light source driving time within the fifth stage, it is possible to modify the intensity of the illumination light instead, to provide the same exposure amount. That is, it is possible to continue driving the light source in the fifth stage while lowering the light intensity down to half the other stages, so as to obtain the same exposure amount in the fifth stage as in the above embodiments where the light source is driven for a half time of the fifth stage period.

Although the photographic paper is transported intermittently in the above embodiment, the present invention is applicable to a digital printer where the recording material is transported continuously. The present invention is also applicable to a digital printer with piezo electric micromirror device.

Although the micromirrors 12 of the first row 51 abut on the second row 52 in the DMD 50 shown in FIG. 8, it is possible to separate the first mirror group 51 by one line from the second mirror group 52 in the sub scan direction. It is also possible to shift the first mirror group 51 in the main scan direction by half the mirror chip side relative to the second mirror group 52, or it is possible to stagger the micromirrors of the same row by half the mirror chip side in the sub scan direction.

Thus, the present invention should not be limited to the above described embodiments but, on the contrary, various modification may be possible to those skilled in the art without departing from the scope of claims attached hereto.

What is claimed is:

1. An exposure method for a printer with a micromirror device as a spatial light modulator, the micromirror device comprising an array of micromirrors, each micromirror being switchable between an ON-state and an OFF-state depending upon which binary value is assigned thereto, a light source for illuminating the micromirrors, and an optical system for forming pixels on a photographic material from light beams reflected from those micromirrors which are in the ON-state, the method comprising the steps of:

A. producing N-bit mirror drive data from image data of one pixel, N being a plural integer;

B. driving the micromirrors by the N-bit mirror drive data sequentially from most to least significant bits at predefined various time intervals; and C. driving the light source continually during a first portion of a plurality of the predefined various time intervals and intermittently during a last portion of the plurality of the predefined various time intervals.

2. An exposure method for a printer with a micromirror device as a spatial light modulator, the micromirror device comprising an array of micromirrors, each being switchable between an ON-state and an OFF-state depending upon which binary value is assigned thereto, a light source for illuminating the micromirrors, and an optical system for forming pixels on a photographic material from light beams reflected from those micromirrors which are in the ON-state, the method comprising the steps of:

A. producing N-bit mirror drive data from image data of one pixel, N being a plural integer;

B. driving the micromirrors by the N-bit mirror drive data sequentially at decreasing time intervals from most to least significant bits;

C. driving the light source to project light continuously while the micromirrors are driven by the most to Jth significant bits of the N-bit mirror drive data, J being an integer less than N; and D. driving the light source to project light intermittently at decreasing light quantity while the micromirrors are driven by the (J+1)th to least significant bits.

3. An exposure method as claimed in claim 2, wherein the driving intervals of the micromirrors decrease to a shortest value at the Jth significant bit, and are maintained to be the shortest while the micromirrors are driven by the (J+1)th to least significant bits, and wherein the light source is driven for shorter time than the shortest driving interval of the micromirrors in step D.

4. An exposure method for a color printer with a micromirror device as a spatial light modulator, the micromirror device comprising an array of micromirrors, each micromirror being switchable between on ON-state and an OFF-state depending upon which binary value is assigned thereto, a light source for illuminating the micromirrors with three color light in a sequential fashion, and an optical system for forming pixels from light beams reflected from those micromirrors which are in the ON-state onto a photographic material along a main scan direction, the method comprising the steps of:

A. transporting the photographic material by one line in a direction perpendicular to the main scan direction;

B. executing three color exposure sequences after each transporting step A, each of the three color exposure sequences comprising the steps of:

(a). producing N-bit mirror drive data for each pixel from image data of one color, N being a plural integer;

(b). driving the micromirrors by the N-bit mirror drive data sequentially from most to least significant bits at decreasing time intervals;

(c). driving the light source to project light of the one color continuously at a constant intensity while the micromirrors are driven by the most to (J)th significant bits of the N-bit mirror drive data, J being an integer less than N; and (d). modulating light quantity from the light source while the micromirrors are driven by the (J+1)th to least significant bits.

5. An exposure method as claimed in claim 4, wherein the driving intervals decrease to a shortest value at the (J)th significant bit, and are maintained to be the shortest while the micromirrors are driven by the (J+1)th to least significant bits, and wherein the light source is driven for a limited time in step (d) that is shorter than the shortest driving interval of the micromirrors and decreases as the driving sequence proceeds in step (d).

6. An exposure method for a printer with a micromirror device as a spatial light modulator, the micromirror device comprising a mirror array consisting of two rows of micromirrors, each micromirror being switchable between an ON-state and an OFF-state depending upon which binary value is assigned thereto, a light source for illuminating the micromirrors, and an optical system for focusing light beams reflected from those micromirrors which are in the ON-state onto a photographic material to form pixels in two lines at one time along a main scan direction, the method comprising the steps of:
   A. producing primary mirror drive data from image data of a first line of a frame, the primary mirror drive data having N bits for each pixel, N being a plural integer;
   B. producing secondary mirror drive data from image data of a second line adjacent to the first line, the secondary mirror drive data having N bits for each pixel,
   C. driving the micromirrors of the first row sequentially by the most to Jth significant bits of the primary mirror drive data, J being an integer less than N;
   D. driving the micromirrors of the second row sequentially by the (J+1)th to least significant bits of the secondary mirror drive data;
   E. modulating intervals for driving the micromirrors of the first row at predetermined ratios while driving the light source continuously at a constant intensity in step C;
   F. modulating light quantity from the light source while maintaining the driving intervals of the micromirrors of the second row at a constant value in step D;
   G. after steps A to F, transporting the photographic material by one line in a sub scan direction perpendicular to the main scan direction;
   H. after step G, producing primary mirror drive data from image data of the second line;
   I. producing secondary mirror drive data from image data of a third line adjacent to the second line; and
J. repeating steps A to I, until the frame is recorded on the photographic material.

7. An exposure method as claimed in claim 6, wherein the driving intervals of the micromirrors become shorter as the driving sequence proceeds in step C, and are maintained constant in step D, whereas the driving times of the light source within the constant driving intervals become shorter as the driving sequence of the micromirrors proceeds in step D.

8. An exposure method as claimed in claim 6, wherein the light source can project three color light, and each time the photographic paper is transported by one line three color exposure sequences are executed while the light source sequentially illuminates the micromirrors with the three color light, each of the three color exposure sequences comprising steps A to F and H and I.

9. An exposure method for a printer with a micromirror device as a spatial light modulator, the micromirror device comprising a mirror array consisting of at least a number Q of rows of micromirrors, Q being an integer, each micromirror being switchable between on ON-state and an OFF-state depending upon which binary value is assigned thereto, a light source for illuminating the micromirrors with three color light, and an optical system for focusing light beams reflected from those micromirrors which are in the ON-state onto a photographic material to form pixels in Q lines a one time along a main scan direction, the method comprising the steps of:
   A. transporting the photographic material by one line in a sub scan direction perpendicular to the main scan direction;
   B. switching the light source to project one of the three color light upon each transporting step A, to execute one color exposure sequence after each line transport, the exposure sequence of each color comprising the steps of:
      (a). producing primary mirror drive data from image data of first to (P)th lines of successive Q lines of a color frame, P being an integer less than Q, the primary mirror drive data having N bits for each pixel of one color, N being a plural integer;
      (b). producing secondary mirror drive data from image data of the (P+1)th to (Q)th lines of the Q lines, the secondary mirror drive data having N bits for each pixel of one color,
      (c). driving a first group of the micromirrors arranged in the first to (P)th rows sequentially by the most to (J)th significant bits of the primary mirror drive data, J being an ineger less than N, at decreasing time intervals, while illuminating the micromirrors with one color light continuously at a constant intensity; and
      (d). driving a second group of the micromirrors arranged in the (P+1l)th to (Q)th rows sequentially by the (J+1)th to least significant bits of the secondary mirror drive data at constant time intervals, while modulating light quantity from the light source; and
   C. repeating above steps while producing the primary and secondary mirror drive data from image data of successive Q lines of a next color frame, wherein the Q lines of the next color frame is shifted one line from those of the preceding color frame.

10. A printer with a spatial light modulator comprising:
an array of micromirrors, each micromirror being switchable between an ON-state and an OFF-state depending upon which binary value is assigned thereto;
a light source for illuminating the micromirrors;
an optical system for forming pixels on a photographic material from light beams reflected from those micromirrors which are in the ON-state;
means for producing N-bit mirror drive data from image data of one pixel, N being a plural integer:
means for driving the micromirrors by the N-bit mirror drive data sequentially from most to least significant bits at predefined various time intervals; and
means for driving the light source continually during a first portion of a plurality of the predefined various time intervals and intermittently during a last portion of the plurality of the predefined various time intervals.

11. A printer as claimed in claim 10, wherein the spatial light modulator is a digital micromirror device.

12. A printer as claimed in claim 10, wherein the light source is constructed by light emission diodes.

13. A printer as claimed in claim 10, wherein the light source includes three color light emission devices, the printer further comprising:
means for transporting the photographic material by one line in a direction perpendicular to the main scan direction; and means for switching the light source to project three color light onto a same position of the photographic material in a sequential fashion each time the photographic material is transported by one line.

14. A printer with a spatial light modulator comprising:

an array of micromirrors, each micromirror being switchable between an ON-state and an OFF-state depending upon which binary value is assigned thereto;

a light source for illuminating the micromirrors;

an optical system for forming pixels on a photographic material from light beams reflected from those micromirrors which are in the ON-state;

means for producing N-bit mirror drive data from image data of one pixel, N being a plural integer;

means for driving the micromirrors by the N-bit mirror drive data sequentially from most to least significant bits at predefined various time intervals; and means for modulating light quantity from the light source within a driving time interval of the micromirrors, wherein the micromirrors are driven by the N-bit mirror drive data sequentially at decreasing time intervals from most to least significant bits, the driving intervals decreasing to a shortest value at the (J)th significant bit, J being an integer less than N, and being maintained to be the shortest while the micromirrors are driven by the (J+1)th to least significant bits, and wherein the light source is driven to project light continuously at a constant intensity while the micromirrors are driven by the most to (J)th significant bits, and is driven for a limited time shorter than the shortest driving interval of the micromirrors while the micromirrors are driven by the (J+1)th to least significant bits.

15. A printer with a spatial light modulator comprising:

a mirror array consisting of at least a number Q of rows of micromirrors, Q being a plural integer, each micromirror being switchable between an ON-state and an OFF-state depending upon which binary value is assigned thereto;

a light source for illuminating the micromirrors with three color light;

an optical system for focusing light beams reflected from those micromirrors which are in the ON-state onto a photographic material to form pixels in Q lines at one time along a main scan direction;

a transporting device for transporting the photographic material by one line in a sub scan direction perpendicular to the main scan direction;

a switching device for switching the light source to project one of three color light sequentially and synchronously with the transport of the photographic material;

means for producing primary mirror drive data from image data of first to (P)th lines of successive Q lines of a color frame, P being an integer less than Q, the primary mirror drive data having N bits for each pixel of one color, N being a plural integer;

means for producing secondary mirror drive data from image data of the (P+1)th to (Q)th lines of the Q lines, the secondary mirror drive data having N bits for each pixel of one color;

means for driving a first group of the micromirrors arranged in the first to (P)th rows sequentially by the most to (J)th significant bits of the primary mirror drive data, J being an integer less than N, at decreasing time intervals;

means for driving a second group of the micromirrors arranged in the (P+1)th to (Q)th rows sequentially by the (J+1)th to least significant bits of the secondary mirror drive data at constant time intervals; and means for driving the light source such that while the micromirrors of the first group are driven by the most to (J)th significant bits of the primary mirror drive data the mirror array is illuminated with one color light continuously at a constant intensity, and while the micromirrors of the second group are driven by the (J+1)th to least significant bits of the secondary mirror drive data the mirror array is illuminated intermittently at decreasing light quantity.

16. A printer as claimed in claim 15, wherein Q=2 and P=1.

17. A printer as claimed in claim 15, wherein Q and P are multiples of three.

18. A printer as claimed in claim 17, wherein the switching device switches the light source to project one of the three color light upon each transport by one line.

19. A printer as claimed in claim 15, wherein the mirror array is a digital micromirror device.

20. A printer as claimed in claim 15, wherein the light source is constructed by light emission diodes.

* * * * *